United States Patent
Chung et al.

(10) Patent No.: US 8,522,673 B2
(45) Date of Patent: Sep. 3, 2013

(54) FOOD HEATING DEVICE

(75) Inventors: Terry Tae-Il Chung, Bartlett, IL (US); Loren Veltrop, Chicago, IL (US); Brian Hee-Eun Lee, West Chicago, IL (US); Donald Van Erden, Wildwood, IL (US); Christopher B. Lyons, Lagrange Park, IL (US)

(73) Assignee: Prince Castle, LLC, Carol Stream, IL (US)

( * ) Notice: Subject to any disclaimer, the term of this patent is extended or adjusted under 35 U.S.C. 154(b) by 967 days.

(21) Appl. No.: 12/329,397

(22) Filed: Dec. 5, 2008

(65) Prior Publication Data

US 2010/0143557 A1    Jun. 10, 2010

(51) Int. Cl.
*A21B 5/02* (2006.01)

(52) U.S. Cl.
USPC ............ 99/373; 99/385; 99/386; 99/404; 99/426; 99/443 C; 99/537; 426/18; 426/19; 426/94; 426/243; 426/496; 426/502; 426/505; 426/523; 426/549; 219/388; 219/400; 219/411

(58) Field of Classification Search
CPC ........... A21D 8/06; A21D 15/02; A47J 37/08; A47J 37/044; A23V 2002/00
USPC ...... 99/404, 537, 373, 443, 443 C, 385–386, 99/426; 100/130; 426/466, 438, 518, 615, 426/506, 18–19, 94, 243, 496, 502, 505, 426/523, 549; 83/663; 219/388, 400, 411; 126/21 A, 39 E, 41 R; 34/178; 432/129, 432/138, 141–142; 198/626.1, 626.2
See application file for complete search history.

(56) References Cited

U.S. PATENT DOCUMENTS

| | | | | |
|---|---|---|---|---|
| 1,519,176 A | * | 12/1924 | Troger et al. | 99/395 |
| 1,533,075 A | * | 4/1925 | Lindemann | 99/395 |
| 1,538,551 A | * | 5/1925 | Harris | 99/395 |
| 1,551,183 A | * | 8/1925 | Vollbrecht | 99/395 |
| 1,617,559 A | * | 2/1927 | Wolcott | 99/398 |
| 1,624,017 A | * | 4/1927 | Shields | 99/395 |
| 1,746,698 A | * | 2/1930 | Galer | 99/391 |
| 1,828,542 A | * | 10/1931 | Padelford | 426/458 |
| 2,120,829 A | * | 6/1938 | Bolling | 432/49 |
| 2,281,271 A | * | 4/1942 | Cullomer | 99/395 |
| 2,477,814 A | * | 8/1949 | MacDonald | 99/395 |
| 2,529,253 A | * | 11/1950 | Hoffman et al. | 99/386 |
| 2,949,869 A | * | 8/1960 | Leeuwrik | 432/152 |
| 3,456,578 A | * | 7/1969 | Pinsly | 99/339 |

(Continued)

OTHER PUBLICATIONS

Club Toaster Model CTX-200L Manual, A.J. Antunes & Co., P/N. 1010993, Rev. D Jun. 2009, © McDonald's Corporation.

*Primary Examiner* — Henry Yuen
*Assistant Examiner* — Brett Spurlock
(74) *Attorney, Agent, or Firm* — Joseph P. Krause

(57) ABSTRACT

A food heating device includes a platen (101) and a pair of conveyor segments (103). A first conveyor segment is arranged and spaced to transport a food product (201, 203, 205) between a first side of the platen (101) and the first conveyor segment (103). A second conveyor segment (103/703/903) is arranged and spaced to transport the food product between a second side of the platen (101) and the second conveyor segment (103/703/903). A transfer device (505/705) may be disposed at one end of the platen (101) such that the transfer device transfers the food product (203) from the first side of the platen (101) to the second side of the platen (101).

15 Claims, 1 Drawing Sheet

(56) References Cited

U.S. PATENT DOCUMENTS

| | | | |
|---|---|---|---|
| 3,494,278 A * | 2/1970 | Chaudoir | 99/386 |
| 3,517,605 A * | 6/1970 | Weiss et al. | 99/423 |
| 3,587,446 A * | 6/1971 | Gardner | 99/339 |
| 3,611,913 A * | 10/1971 | McGinley | 99/349 |
| 3,646,880 A * | 3/1972 | Norris | 99/349 |
| 3,677,171 A * | 7/1972 | Le Van | 99/339 |
| 3,693,452 A * | 9/1972 | McGinley et al. | 99/386 |
| 3,739,712 A * | 6/1973 | Duning | 99/349 |
| 3,835,760 A * | 9/1974 | Rekesius | 99/331 |
| 3,987,718 A * | 10/1976 | Lang-Ree et al. | 99/386 |
| 4,009,775 A * | 3/1977 | Wolfelsperger et al. | 198/403 |
| 4,164,591 A * | 8/1979 | Ahlgren et al. | 426/523 |
| 4,179,985 A * | 12/1979 | Baker et al. | 99/339 |
| 4,188,866 A * | 2/1980 | Baker et al. | 99/339 |
| 4,189,631 A * | 2/1980 | Baker et al. | 219/388 |
| 4,207,810 A * | 6/1980 | Noel | 99/373 |
| 4,254,697 A * | 3/1981 | Lang-Ree et al. | 99/387 |
| 4,261,257 A * | 4/1981 | Henderson et al. | 99/386 |
| 4,281,594 A * | 8/1981 | Baker et al. | 99/386 |
| 4,286,509 A | 9/1981 | Miller et al. | |
| 4,444,094 A * | 4/1984 | Baker et al. | 99/327 |
| 4,453,457 A * | 6/1984 | Gongwer et al. | 99/345 |
| 4,508,025 A * | 4/1985 | Schultz | 99/353 |
| 4,530,276 A | 7/1985 | Miller | |
| 4,567,819 A * | 2/1986 | Adamson | 99/349 |
| 4,569,851 A * | 2/1986 | Schultz | 426/496 |
| 4,583,451 A * | 4/1986 | Kanagy | 99/423 |
| 4,784,869 A * | 11/1988 | Bishop | 426/523 |
| 5,044,264 A * | 9/1991 | Forney | 99/349 |
| 5,060,561 A * | 10/1991 | Campo | 99/353 |
| 5,077,072 A * | 12/1991 | Sieradzki | 426/523 |
| 5,088,391 A * | 2/1992 | Anderson | 99/423 |
| 5,588,354 A * | 12/1996 | Stuck et al. | 99/386 |
| 5,960,704 A | 10/1999 | March et al. | |
| 6,177,654 B1 * | 1/2001 | Schackmuth | 219/388 |
| 6,192,789 B1 * | 2/2001 | Agcaoili et al. | 99/349 |
| 6,201,218 B1 * | 3/2001 | Chandler et al. | 219/388 |
| 6,223,650 B1 * | 5/2001 | Stuck | 99/386 |
| 6,676,986 B1 * | 1/2004 | Huttenbauer, Jr. | 426/646 |
| 6,717,111 B2 * | 4/2004 | Sands et al. | 219/388 |
| 6,789,465 B2 * | 9/2004 | Sands et al. | 99/423 |
| 7,067,769 B2 * | 6/2006 | Sands et al. | 219/388 |
| 7,285,755 B1 * | 10/2007 | Kingdon et al. | 219/388 |
| 7,297,903 B1 | 11/2007 | March et al. | |
| 2001/0001462 A1 * | 5/2001 | Chandler et al. | 219/388 |
| 2004/0177769 A1 * | 9/2004 | Kobayashi | 99/360 |
| 2005/0006204 A1 * | 1/2005 | Behymer et al. | 198/494 |
| 2005/0072311 A1 * | 4/2005 | Szymanski | 99/349 |
| 2005/0109216 A1 * | 5/2005 | Jones et al. | 99/386 |
| 2005/0115418 A1 * | 6/2005 | Sands et al. | 99/423 |
| 2006/0236872 A1 * | 10/2006 | Nordberg et al. | 99/349 |
| 2006/0246199 A1 * | 11/2006 | Fletcher | 426/582 |

* cited by examiner

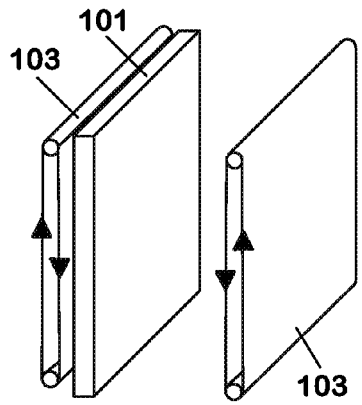
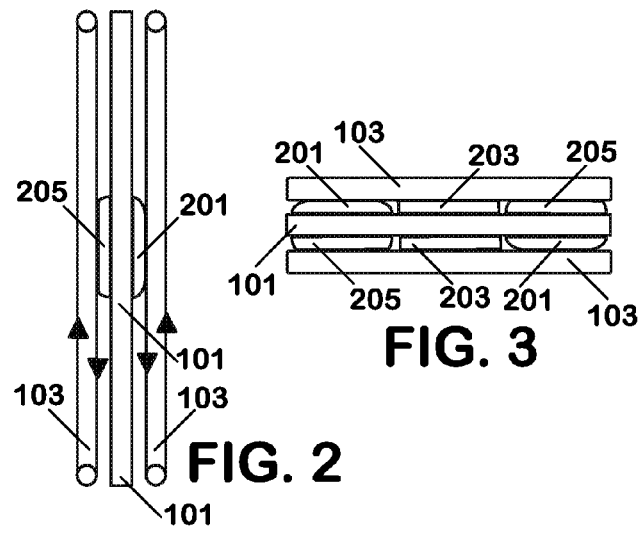
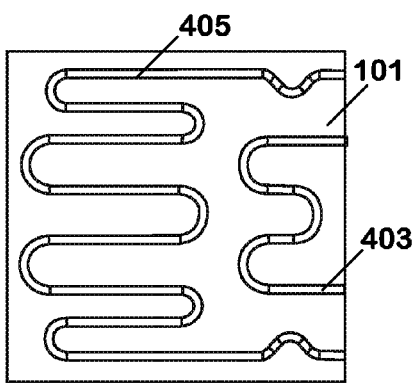
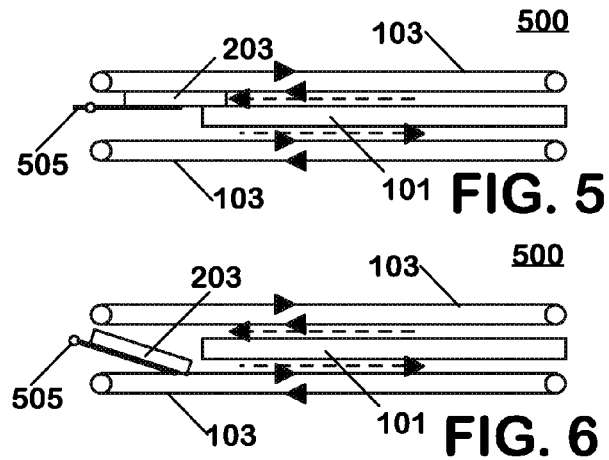
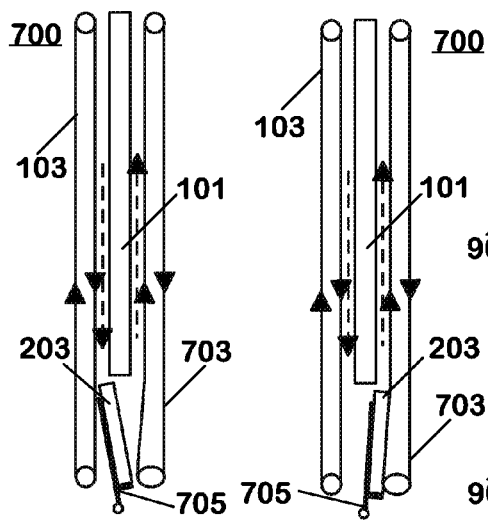
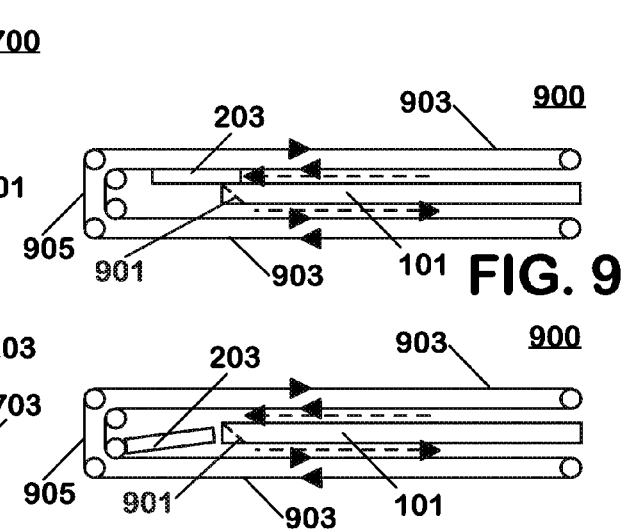

FOOD HEATING DEVICE

FIELD OF THE INVENTION

This invention relates to apparatus utilized in food preparation. Such apparatus include, but not limited to, apparatus utilized in the heating of food products such as bread-type food products, including buns, rolls, croissants, bagels, muffins, and the like, as well as pasta, vegetables, cakes, pastries, and so forth.

BACKGROUND OF THE INVENTION

Restaurants often heat bread-type food products, referred to hereinafter as bread products, ranging from bread slices to buns, rolls, croissants, bagels, and the like. Such heating may include warming, toasting or browning (also known as a Maillard reaction), and steaming.

At times, it may be desired to process different parts of a food product differently, although the food product is desired to be completed or assembled at the same time. For example, a club-type sandwich typically includes a bun with a top, a center, and a bottom. Such a sandwich often requires the center to be toasted on both sides, while the top and bottom need only be toasted on one side.

Accordingly, there is a need for a heating device that can heat multiple parts of a food product so that all components are heated as needed.

BRIEF DESCRIPTION OF THE DRAWINGS

FIG. 1 is a partially exploded perspective view of a heating device having a platen in accordance with the invention.

FIG. 2 is a side view of the platen in accordance with the invention.

FIG. 3 is a top view of the platen in accordance with the invention.

FIG. 4 is a front view of a platen with internal heating elements in accordance with the invention.

FIG. 5 and FIG. 6 are side views of a horizontal platen with a pair of conveyor segments and a transfer mechanism in accordance with the invention.

FIG. 7 and FIG. 8 are side views of a vertical platen with a pair of conveyor segments and a transfer mechanism in accordance with the invention.

FIG. 9 and FIG. 10 are side views of a horizontal platen with a pair of conveyor segments and no transfer mechanism in accordance with the invention.

DESCRIPTION OF A PREFERRED EMBODIMENT

The following describes an apparatus for and method of heating, also known as heat processing, food products, such as bread-type food products, including buns, rolls, croissants, bagels, muffins, flatbread, pitas, and the like, as well as pasta, vegetables, cakes, pastries, and so forth.

Various embodiments of platens are disclosed that heat one and/or both sides of a food product. Several embodiments include multiple platens. Each platen advantageously comprises one or more heating elements. The heating elements are utilized to heat, including, for example, to heat process, warm, toast or brown (also known as a Maillard reaction), steam, grill, defrost, and/or thaw. The platens are typically planar and may be disposed horizontally, vertically, or a combination thereof. The platens shown in the drawings are not necessarily shown proportional to their actual size. The platens are ideally comprised of a material with good heat transfer properties, such as aluminum, steel, ceramic, and/or other thermally conductive materials, and advantageously have a smooth, non-stick surface. The length, width, and temperature of the platen(s) are selected to provide the desired heating when used in conjunction with one or more conveyor segments, whose speed may also be variable.

A partially exploded perspective view of a heating device 100 having a platen is shown in FIG. 1. The food product is received on one or more sides of a platen 101 and directed along the platen by one or more conveyor segments 103. A conveyor segment 103 is disposed on each side of the platen 101. Each conveyor segment 103 advantageously transports one or more food products in the same direction, e.g., vertically downward, along each side of the platen 101 by use of a belt that keeps the platen 101 in contact with the food product as it slides along the platen 101. The food product is static relative to the belt of the conveyor segment 103, which is dynamic relative to the platen 101. As a result, the heat transfer rate is higher and food sticking is reduced. The conveyor segments 103 may be conventional conveyor segments including rollers and wire or silicone belts intended for use in the food industry. The conveyor segments herein may be components of a single conveyor system, such as shown in FIG. 9 and FIG. 10 with a single conveyor belt, or each conveyor segment may be an individual conveyor, for example, as shown in FIG. 5 through FIG. 8 where each conveyor segment has its own conveyor belt. The claims and claim limitations should be construed accordingly. Brackets, stands, and electrical connections for the conveyor segments and platen (not shown) are known in the art.

A side view of the heating device 100 is shown in FIG. 2 and a top view of the heating device 100 is shown in FIG. 3. The food product is shown in FIG. 2 and FIG. 3 in the example of a 3-part bun for a round club-type sandwich, including a top 201, a center 203, and a bottom 205, so named for the sake of reference, but not necessarily orientation. With this example, which will be utilized throughout the drawings, the center 203 is desired to be toasted on both sides, whereas the top 201 and 205 are toasted on one side. To toast both sides of the center 203, an operator runs the center 203 through the heating device twice, with a different side of the center 203 being transported along the platen 101 each time. Food products may be heated on both sides of the platen 101 because one conveyor segment 103 is disposed near a first side of the platen 101 and another conveyor segment 103 is disposed near a second side of the platen 101.

A front view of platen 101 with internal heating elements is shown in FIG. 4. The platen 101 may include one or more heating elements 403, 405. Many other arrangements of heating elements may be successfully utilized other than the example shown in the drawings, including, for example, one or more heating elements, different paths of the heating elements, and so forth.

Side views of a horizontal platen with a pair of conveyor segments and a transfer mechanism are shown in FIG. 5 and FIG. 6. This embodiment of a heating device 500 utilizes a first conveyor segment 103 to transport or guide the food product 203 in one horizontal direction along one side of the platen 101 and a second conveyor segment 103 to transport or guide the food product 203 in the opposite horizontal direction along the other side of the platen 101. Thus, each side of the platen 101 heats one side of the food product 203. A transfer device 505, embodied as a paddle or diverter vane that pivots about an axis that extends into the plane of FIG. 5 and FIG. 6, is disposed at one end of the platen 101 in order to transfer the food product 203 from the first side of the platen 101 to the second side of the platen 101. The transfer device 505 may automatically perform this function. For example, a weight sensor or spring load may keep the transfer device 505 in its initial position as shown in FIG. 5, and when a predetermined percentage of the weight of the food product 203 is detected, or if an end of the food product is detected to be at a certain position along the length of the transfer device 505, the transfer device 505 rotates about its axis to transfer or deflect the food product 203 to the second conveyor segment 103, which transports/guides the food product horizontally in the other direction along the other side of the platen 101 as shown in FIG. 6. Similar sensors or devices may be utilized in reverse to return the transfer device 505 to its initial position. The transfer device 505 is advantageously placed at a location along the platen 101 to transfer the center 203, for example, at the center of the platen 101. Other food products that do not require heating on both sides, such as the top 201 and bottom 205, may be transported/guided along the platen 101 where a transfer device is not present, for example, along the sides of the platen 101. Two transfer mechanisms 505 may be located along the platen 101 so that two sets of 3-part buns may be heated at the same time along both sides of the platen 101.

Side views of a vertical platen with a pair of conveyor segments and a transfer mechanism are shown in FIG. 7 and FIG. 8. This embodiment of a heating device 700 utilizes a first conveyor segment 103 to transport or guide the food product 203 in one direction along one side of the platen 101 and a second conveyor segment 707 to transport or guide the food product 203 in the opposite direction along the other side of the platen 101. Thus, each side of the platen 101 heats one side of the food product 203. A transfer device 705, embodied as a paddle or diverter vane that pivots about an axis that extends into the plane of FIG. 7 and FIG. 8, is disposed at one end of the platen 101 in order to transfer the food product 203 from the first side of the platen 101 to the second side of the platen 101. The transfer device 705 may automatically perform this function. For example, a weight sensor or spring load may keep the transfer device 705 in its initial position as shown in FIG. 7, and when a predetermined percentage of the weight of the food product 203 is detected, or if an end of the food product is detected to be at a certain position along the length of the transfer device 705, the transfer device 705 rotates about its axis to transfer or deflect the food product 203 to the second conveyor segment 703, which advantageously has an angled section to more easily catch and transport/guide the food product up the other side of the platen 101 as shown in FIG. 8. Similar sensors or devices may be utilized in reverse to return the transfer device 705 to its initial position. The transfer device 705 is advantageously placed at a location along the platen 101 to transfer the center 203, for example, at the center of the platen 101. Other food products that do not require heating on both sides, such as the top 201 and bottom 205, may be transported/guided along the platen 101 where a transfer device is not present, for example, along the sides of the platen 101. Two transfer mechanisms 705 may be located along the platen 101 so that two sets of 3-part buns may be heated at the same time along both sides of the platen 101.

Side views of a horizontal platen with a pair of conveyor segments and no transfer mechanism are shown in FIG. 9 and FIG. 10. This embodiment of a heating device 500 utilizes a first conveyor segment 903 to transport or guide the food product 203 in one horizontal direction along one side of the platen 101 and a second conveyor segment 903 to transport or guide the food product 203 in the opposite horizontal direction along the other side of the platen 101. Thus, each side of the platen 101 heats one side of the food product 203. The second conveyor segment 903 is disposed below the platen and extends horizontally beyond the platen. The food product is heated along the first or upper side of the platen while transported or guided by the first conveyor segment 903 that is disposed above the platen 101. When the food product 203 reaches an end of the first side of the platen 101, the food product 203 falls onto the second conveyor segment 903, where the food product 203 is transported or guided horizontally in the opposite direction along the second or lower side of the platen as shown in FIG. 10. The second conveyor segment 903 may advantageously be longer only at a location along the platen 101 where the center 203 travels, for example, at one side of the platen 101. Other food products that do not require heating on both sides, such as the top 201 and bottom 205, may be transported/guided along the platen 101 where the second conveyor segment 903 is not longer than the platen 101. The width of the longer part of the second conveyor segment 903 sufficient to handle two centers 203 at the same time, so that two sets of 3-part buns may be heated at the same time along both sides of the platen 101. The lower left end of the platen 101 of the heating device 500, 900 may optionally have a part of the lower corner removed as indicated by the dashed line 901 to facilitate the food product 203 being directed along the second (lower) conveyor segment 903. The resulting corner may be linear, curved, or a combination thereof. The conveyor system 905 shown in FIG. 9 and FIG. 10 is comprised of a single belt system. The conveyor segments 103, 703 of the embodiments of FIG. 1 through FIG. 3 and FIG. 5 through FIG. 8 may also be configured as a single belt system with the addition of rollers at one end, such as shown in FIG. 9 and FIG. 10.

The heating device as set forth herein has many advantages, including heating all sides of the food products as needed. Various embodiments minimize the counter space necessary for the heating device. The conveyors may be optimally used to reduce the size of the heating device. By use of a conveyor belt that keeps the platen in contact with the food product, the food product is static relative to the belt of the conveyor, which is dynamic relative to the platen, the heat transfer rate is higher and food sticking is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A food heating device comprising:
a substantially planar platen having first and second opposing sides and at least one heating element within the substantially planar platen and located between the first and second opposing sides;
a first conveyor segment adjacent the first side of the substantially planar platen, rotating in a first direction relative to the substantially planar platen, the first conveyor segment being arranged and spaced away from the first side of the substantially planar platen, such that when a food product having first and second sides, is between the first conveyor segment and the first side of the substantially planar platen, a first side of the food product will make direct contact with the first side of the substantially planten and the second side of the food product will make a direct contact with the first conveyor to transport the food product along the first side of the platen in the first direction, by the rotation of the first conveyor in the first direction; and a second conveyor segment adjacent the second side of the substantially planar platen, rotating in a second direction relative to the substantially planar platen, which is opposite the first direction, the second conveyor segment being arranged and spaced away from the second side of the substantially planar platen such that when the food product having first and second sides, is between the second conveyor segment and the second side of the substantially planar platen, the second side of the food product will make a direct contact with the second side of the substantially planar platen, the first side of the food product will make a direct contact with the second conveyor in order to transport the food product along the second side of the platen in the second direction, by the rotation of the second conveyor in the second direction.

2. The food heating device of claim 1, wherein after the food product reaches an end of the first side of the platen, the food product falls onto the second conveyor segment.

3. The food heating device of claim 1, wherein the platen has a non-stick surface.

4. The food heating device of claim 1, wherein the platen is planar and is disposed horizontally.

5. The food heating device of claim 1, wherein the platen is planar and is disposed vertically.

6. The food heating device of claim 1, wherein the first platen and the first and second conveyors are arranged and constructed to toast two opposing sides of the food product.

7. The food heating device of claim 1, wherein the food product is static relative to a belt of at least one of the first conveyor segment and the second conveyor segment.

8. A food heating device comprising:

a substantially planar platen having first and second opposing sides and at least one heating element within the substantially planar platen and located between the first and second opposing sides;

a first conveyor segment adjacent a first side of the substantially planar platen, and which is arranged and spaced away from the first side of the substantially planar platen to cause a food product to contact the first side of the substantially planar platen and to simultaneously transport the food product in a first direction, along and between the first side of the platen and the first conveyor segment;

a second conveyor segment adjacent a second side of the substantially planar platen, and which is arranged and spaced away from the second side of the substantially planar platen to cause the food product to contact the second side of the substantially planar platen and to simultaneously transport the food product in a second direction, along and between the second side of the platen and the second conveyor segment;

a diverter vane disposed at one end of the platen such that the diverter vane transfers the food product from the first side of the platen to the second side of the platen.

9. The food heating device of claim 8, wherein the transfer device automatically transfers the food product from the first side of the platen to the second side of the platen.

10. The food heating device of claim 8, wherein the first and second directions are the same.

11. The food heating device of claim 8, wherein the platen is configured to have a non-stick surface on at least one of the first and second sides thereof.

12. The food heating device of claim 8, wherein the platen is planar and is disposed horizontally.

13. The food heating device of claim 8, wherein the platen is planar and is disposed vertically.

14. The food heating device of claim 8, wherein the first platen and the second platen are arranged and constructed to toast the food product.

15. The food heating device of claim 8, wherein the food product is static relative to a belt of at least one of the first conveyor segment and the second conveyor segment.

* * * * *